United States Patent
Paolini, Jr. et al.

(10) Patent No.: US 7,079,305 B2
(45) Date of Patent: *Jul. 18, 2006

(54) ELECTROPHORETIC MEDIUM AND PROCESS FOR THE PRODUCTION THEREOF

(75) Inventors: Richard J. Paolini, Jr., Arlington, MA (US); David D. Miller, Wakefield, MA (US); Barrett Comiskey, Shanghai (CN)

(73) Assignee: E Ink Corporation, Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/906,075

(22) Filed: Feb. 2, 2005

(65) Prior Publication Data
US 2005/0105162 A1    May 19, 2005

Related U.S. Application Data

(62) Division of application No. 09/683,903, filed on Feb. 28, 2002, now Pat. No. 6,866,760.

(60) Provisional application No. 60/277,079, filed on Mar. 19, 2001, provisional application No. 60/277,391, filed on Mar. 19, 2001.

(51) Int. Cl.
*G02B 26/00* (2006.01)
*G09G 3/34* (2006.01)

(52) U.S. Cl. ....................... 359/296; 345/107
(58) Field of Classification Search ........... 359/296; 345/107; 427/213.3; 430/32; 252/583, 252/586; 204/487; 264/4
See application file for complete search history.

(56) References Cited

U.S. PATENT DOCUMENTS

| | | | |
|---|---|---|---|
| 2,932,629 A | 4/1960 | Wiley et al. |
| 2,934,530 A | 4/1960 | Ballast et al. |
| 3,668,106 A | 6/1972 | Ota |
| 3,756,693 A | 9/1973 | Ota |
| 3,767,392 A | 10/1973 | Ota |
| 3,792,308 A | 2/1974 | Ota |
| 3,870,517 A | 3/1975 | Ota et al. |

(Continued)

FOREIGN PATENT DOCUMENTS

EP    0 443 571 A2    8/1991

(Continued)

OTHER PUBLICATIONS

Amundson, K. et al., "Flexible, Active-Matrix Display Constructed Using a Microencapsulated Electrophoretic Material and an Organic-Semiconductor-Based Backplane", SID 01 Digest, 160 (Jun. 2001).

(Continued)

*Primary Examiner*—Ricky Mack
*Assistant Examiner*—Wiliiam Choi
(74) *Attorney, Agent, or Firm*—David J. Cole

(57) ABSTRACT

A two-phase electrophoretic medium comprises a continuous phase and a discontinuous phase. The discontinuous phase comprises a plurality of droplets, each of which comprises a suspending fluid and at least one particle disposed within the suspending fluid and capable of moving through the fluid upon application of an electric field to the electrophoretic medium. The continuous phase surrounds and encapsulates the discontinuous phase. The discontinuous phase comprises at least about 40 percent by volume of the electrophoretic medium.

14 Claims, 2 Drawing Sheets

U.S. PATENT DOCUMENTS

| | | |
|---|---|---|
| 3,892,568 A | 7/1975 | Ota |
| 4,418,346 A | 11/1983 | Batchelder |
| 4,435,047 A | 3/1984 | Fergason |
| 4,605,284 A | 8/1986 | Fergason |
| 4,616,903 A | 10/1986 | Fergason |
| 4,643,528 A | 2/1987 | Bell, Jr. |
| 4,707,080 A | 11/1987 | Fergason |
| 4,833,060 A | 5/1989 | Nair et al. |
| 4,835,084 A | 5/1989 | Nair et al. |
| 4,965,131 A | 10/1990 | Nair et al. |
| 4,994,312 A | 2/1991 | Maier et al. |
| 5,055,371 A | 10/1991 | Lee et al. |
| 5,216,530 A | 6/1993 | Pearlman et al. |
| 5,270,843 A | 12/1993 | Wang |
| 5,351,143 A | 9/1994 | Sato et al. |
| 5,354,799 A | 10/1994 | Bennett et al. |
| 5,411,398 A | 5/1995 | Nakanishi et al. |
| 5,463,491 A | 10/1995 | Check, III |
| 5,463,492 A | 10/1995 | Check, III |
| 5,530,567 A | 6/1996 | Takei |
| 5,580,692 A | 12/1996 | Lofftus et al. |
| 5,594,562 A | 1/1997 | Sato et al. |
| 5,650,872 A | 7/1997 | Saxe et al. |
| 5,700,608 A | 12/1997 | Eshelman et al. |
| 5,745,094 A | 4/1998 | Gordon, II et al. |
| 5,760,761 A | 6/1998 | Sheridon |
| 5,777,782 A | 7/1998 | Sheridon |
| 5,798,315 A | 8/1998 | Etoh et al. |
| 5,808,783 A | 9/1998 | Crowley |
| 5,872,552 A | 2/1999 | Gordon, II et al. |
| 5,930,026 A | 7/1999 | Jacobson et al. |
| 5,961,804 A | 10/1999 | Jacobson et al. |
| 6,017,584 A | 1/2000 | Albert et al. |
| 6,025,896 A | 2/2000 | Hattori et al. |
| 6,054,071 A | 4/2000 | Mikkelsen, Jr. |
| 6,055,091 A | 4/2000 | Sheridon et al. |
| 6,067,185 A | 5/2000 | Albert et al. |
| 6,097,531 A | 8/2000 | Sheridon |
| 6,118,426 A | 9/2000 | Albert et al. |
| 6,120,588 A | 9/2000 | Jacobson |
| 6,120,839 A | 9/2000 | Comiskey et al. |
| 6,124,851 A | 9/2000 | Jacobson |
| 6,128,124 A | 10/2000 | Silverman |
| 6,130,773 A | 10/2000 | Jacobson et al. |
| 6,130,774 A | 10/2000 | Albert et al. |
| 6,137,467 A | 10/2000 | Sheridon et al. |
| 6,144,361 A | 11/2000 | Gordon, II et al. |
| 6,147,791 A | 11/2000 | Sheridon |
| 6,156,473 A | 12/2000 | Tyagi et al. |
| 6,172,798 B1 | 1/2001 | Albert et al. |
| 6,177,921 B1 | 1/2001 | Comiskey et al. |
| 6,184,856 B1 | 2/2001 | Gordon, II et al. |
| 6,215,540 B1 | 4/2001 | Stephenson |
| 6,215,920 B1 | 4/2001 | Whitehead et al. |
| 6,225,971 B1 | 5/2001 | Gordon, II et al. |
| 6,232,950 B1 | 5/2001 | Albert et al. |
| 6,241,921 B1 | 6/2001 | Jacobson et al. |
| 6,249,271 B1 | 6/2001 | Albert et al. |
| 6,252,564 B1 | 6/2001 | Albert et al. |
| 6,262,706 B1 | 7/2001 | Albert et al. |
| 6,262,833 B1 | 7/2001 | Loxley et al. |
| 6,271,823 B1 | 8/2001 | Gordon, II et al. |
| 6,300,932 B1 | 10/2001 | Albert |
| 6,301,038 B1 | 10/2001 | Fitzmaurice et al. |
| 6,312,304 B1 | 11/2001 | Duthaler et al. |
| 6,312,971 B1 | 11/2001 | Amundson et al. |
| 6,323,989 B1 | 11/2001 | Jacobson et al. |
| 6,327,072 B1 * | 12/2001 | Comiskey et al. ......... 359/296 |
| 6,376,828 B1 | 4/2002 | Comiskey |
| 6,377,383 B1 | 4/2002 | Whitehead et al. |
| 6,377,387 B1 | 4/2002 | Duthaler et al. |
| 6,392,785 B1 | 5/2002 | Albert et al. |
| 6,392,786 B1 | 5/2002 | Albert |
| 6,413,790 B1 | 7/2002 | Duthaler et al. |
| 6,422,687 B1 | 7/2002 | Jacobson |
| 6,445,374 B1 | 9/2002 | Albert et al. |
| 6,445,489 B1 | 9/2002 | Jacobson et al. |
| 6,459,418 B1 | 10/2002 | Comiskey et al. |
| 6,473,072 B1 | 10/2002 | Comiskey et al. |
| 6,480,182 B1 | 11/2002 | Turner et al. |
| 6,498,114 B1 | 12/2002 | Amundson et al. |
| 6,498,674 B1 | 12/2002 | Sheridon |
| 6,504,524 B1 | 1/2003 | Gates et al. |
| 6,506,438 B1 | 1/2003 | Duthaler et al. |
| 6,512,354 B1 | 1/2003 | Jacobson et al. |
| 6,515,649 B1 | 2/2003 | Albert et al. |
| 6,518,949 B1 | 2/2003 | Drzaic |
| 6,531,997 B1 | 3/2003 | Gates et al. |
| 6,535,197 B1 | 3/2003 | Comiskey et al. |
| 6,538,801 B1 | 3/2003 | Jacobson et al. |
| 6,545,291 B1 | 4/2003 | Amundson et al. |
| 6,580,545 B1 | 6/2003 | Morrison et al. |
| 6,639,578 B1 | 10/2003 | Comiskey et al. |
| 6,657,772 B1 | 12/2003 | Loxley |
| 6,664,944 B1 | 12/2003 | Albert et al. |
| 6,672,921 B1 | 1/2004 | Liang et al. |
| 6,680,725 B1 | 1/2004 | Jacobson |
| 6,683,333 B1 | 1/2004 | Kazlas et al. |
| 6,693,620 B1 | 2/2004 | Herb et al. |
| 6,704,133 B1 | 3/2004 | Gates et al. |
| 6,710,540 B1 | 3/2004 | Albert et al. |
| 6,721,083 B1 | 4/2004 | Jacobson et al. |
| 6,724,519 B1 | 4/2004 | Morrison et al. |
| 6,727,881 B1 | 4/2004 | Albert et al. |
| 6,750,473 B1 | 6/2004 | Amundson et al. |
| 6,753,999 B1 | 6/2004 | Zehner et al. |
| 6,788,449 B1 | 9/2004 | Liang et al. |
| 6,816,147 B1 | 11/2004 | Albert |
| 6,822,782 B1 * | 11/2004 | Pratt et al. ................. 359/296 |
| 6,825,068 B1 | 11/2004 | Denis et al. |
| 6,825,829 B1 | 11/2004 | Albert et al. |
| 6,839,158 B1 | 1/2005 | Albert et al. |
| 6,842,657 B1 | 1/2005 | Drzaic et al. |
| 6,864,875 B1 | 3/2005 | Drzaic et al. |
| 2002/0060321 A1 | 5/2002 | Kazlas et al. |
| 2002/0063661 A1 | 5/2002 | Comiskey et al. |
| 2002/0090980 A1 | 7/2002 | Wilcox et al. |
| 2002/0113770 A1 | 8/2002 | Jacobson et al. |
| 2002/0130832 A1 | 9/2002 | Baucom et al. |
| 2003/0020844 A1 | 1/2003 | Albert et al. |
| 2003/0102858 A1 | 6/2003 | Jacobson et al. |
| 2003/0132908 A1 | 7/2003 | Herb et al. |
| 2003/0151702 A1 | 8/2003 | Morrison et al. |
| 2004/0119681 A1 | 6/2004 | Albert et al. |
| 2005/0035941 A1 | 2/2005 | Albert et al. |

FOREIGN PATENT DOCUMENTS

| | | |
|---|---|---|
| EP | 0 659 866 A2 | 6/1995 |
| EP | 1 115 026 A2 | 7/2001 |
| WO | WO 00/05704 | 2/2000 |
| WO | WO 00/36560 | 6/2000 |
| WO | WO 00/38000 | 6/2000 |
| WO | WO 00/67110 | 11/2000 |
| WO | WO 00/67327 | 11/2000 |
| WO | WO 01/07961 | 2/2001 |
| WO | WO 01/27690 | 4/2001 |

OTHER PUBLICATIONS

Bach, U., et al., "Nanomaterials-Based Electrochromics for Paper-Quality Displays", Adv. Mater, 14(11), 845 (2002).

Bampfield, H.A., and Cooper, J., "Emulsion Explosives", in "Encyclopedia of Emulsion Technology: vol. 3—Basic Theory Measurement Applications", Becher. P. (ed.), Marcel Dekker, New York (1988).

Cameron, N.R., et al., "High Internal Phase Emulsions (HIPEs)—Structure, Properties and Use in Polymer Preparation", Adv. Polym. Sci., 126, 163 (1996).

Chen, Y., et al., "A Conformable Electronic Ink Display using a Foil-Based a-Si TFT Array", SID 01 Digest, 157 (Jun. 2001).

Comiskey, B., et al., "An electrophoretic ink for all-printed reflective electronic displays", Nature, 394, 253 (1998).

Comiskey, B., et al., "Electrophoretic Ink: A Printable Display Material", SID 97 Digest (1997), p. 75.

Drzaic, P., et al., "A Printed and Rollable Bistable Electronic Display", SID 98 Digest (1998), p. 1131.

Duthaler, G., et al., "Active-Matrix Color Displays Using Electrophoretic Ink and Color Fiters", SID 02 Digest, 1374 (2002).

Jacobson, J., et al., "the last book", IBM Systems J., 36, 457 (1997).

Ji, Y., et al., "P-50: Polymer Walls in Higher-Polymer-Content Bistable Reflective Cholesteric Displays", SID 96 Digest, 611 (1996).

Jo, G-R, et al., "Toner Display Based on Particle Movements", Chem. Mater, 14, 664 (2002).

Kazlas, P., et al., "12.1" SVGA Microencapsulated Electrophoretic Active Matrix Display for Information Applicances, SID 01 Digest, 152 (Jun. 2001).

Kitamura, T., et al., "Electrical toner movement for electronic paper-like display", Asia Display/IDW '01, p. 1517, Paper HCS1-1 (2001).

O'Regan, B. et al., "A Low Cost, High efficiency Solar Cell Based on Dye-sensitized colloidal TiO2 Films", Nature, vol. 353, Oct. 24, 1991, 773-740.

Pitt, M.G., et al., "Power Consumption of Microencapsulated Electronic Displays for Smart Handheld Applications", SID 02 Digest, 1378 (2002).

Webber, R., "Image Stability in Active-Matrix Microencapsulated Electrophoretic Displays", SID 02 Digest, 126 (2002).

Wood, D., "An Electrochromic Renaissance?" Information Display, 18(3), 24 (Mar. 2002).

Yamaguchi, Y., et al., "Toner display using insulative particles charged triboelectrically", Asia Display/IDW '01, p. 1729, Paper AMD4-4 (2001).

* cited by examiner

ELECTROPHORETIC MEDIUM AND PROCESS FOR THE PRODUCTION THEREOF

CROSS REFERENCE TO RELATED APPLICATIONS

This application is a divisional of application Ser. No. 09/683,903, filed Feb. 28, 2002 (Publication No. 2002/0131147), now U.S. Pat. No. 6,866,760 which claims priority from Provisional Applications Ser. No. 60/277,079 filed Mar. 19, 2001 and Ser. No. 60/277,391 filed Mar. 19, 2001.

This application is related to application Ser. No. 09/493,635, filed Jan. 28, 2000 (now U.S. Pat. No. 6,392,785), which is a divisional of application Ser. No. 09/141,105 filed Aug. 27, 1998 (now U.S. Pat. No. 6,067,185), which in turns claims priority from thirty earlier applications. The entire contents of these thirty-four prior applications are herein incorporated by reference.

BACKGROUND OF INVENTION

This invention relates to a electrophoretic medium and to a process for the production of this medium. More specifically, this invention relates to a two-phase electrophoretic medium which comprises a discontinuous phase containing electrophoretically-mobile particles and a continuous phase essentially free from such particles.

Electrophoretic displays have been the subject of intense research and development for a number of years. Such displays can have attributes of good brightness and contrast, wide viewing angles, state bistability, and low power consumption when compared with liquid crystal displays. (The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element.) Nevertheless, problems with the long-term image quality of these displays have prevented their widespread usage. For example, particles that make up electrophoretic displays tend to cluster and settle, resulting in inadequate service-life for these displays.

Numerous patents and applications assigned to or in the names of the Massachusetts Institute of Technology and E Ink Corporation have recently been published described encapsulated electrophoretic media. Such encapsulated media comprise numerous small capsules, each of which itself comprises an internal phase containing electrophoretically-mobile particles suspended in a liquid suspension medium, and a capsule wall surrounding the internal phase. Typically, the capsules are themselves held within a polymeric binder to form a coherent layer positioned between two electrodes. Encapsulated media of this type are described, for example, in U.S. Pat. Nos. 5,930,026; 5,961,804; 6,017,584; 6,067,185; 6,118,426; 6,120,588; 6,120,839; 6,124,851; 6,130,773; 6,130,774; 6,172,798; 6,177,921; 6,232,950; 6,241,921; 6,249,271; 6,252,564; 6,262,706; 6,262,833; 6,300,932; 6,312,304; 6,312,971; 6,323,989; and 6,327,072; U.S. Patent Application Publication No. 2001-0045934; and International Applications Publication Nos. WO 97/04398; WO 98/03896; WO 98/19208; WO 98/41898; WO 98/41899; WO 99/10767; WO 99/10768; WO 99/10769; WO 99/47970; WO 99/53371; WO 99/53373; WO 99/56171; WO 99/59101; WO 99/67678; WO 00/03349; WO 00/03291; WO 00/05704; WO 00/20921; WO 00/20922; WO 00/20923; WO 00/26761; WO 00/36465; WO 00/36560; WO 00/36666; WO 00/38000; WO 00/38001; WO 00/59625; WO 00/60410; WO 00/67110; WO 00/67327 WO 01/02899; WO 01/07691; WO 01/08241; WO 01/08242; WO 01/17029; WO 01/17040; WO 01/17041; WO 01/80287 and WO 02/07216. The entire disclosures of all these patents and published applications, all of which are in the name of, or assigned to, the Massachusetts Institute of Technology or E Ink Corporation, are herein incorporated by reference.

Many of the aforementioned patents and applications recognize that the walls surrounding the discrete microcapsules in an encapsulated electrophoretic medium could be replaced by a continuous phase, thus producing a so-called "polymer-dispersed electrophoretic display" in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, WO 01/02899, at page 10, lines 6–19. However, none of the aforementioned patents and applications describe an experimental preparation of such a polymer-dispersed electrophoretic display.

It has now been found that two-phase electrophoretic media with advantageous properties can be prepared using a simple, inexpensive process, and this invention relates to such media and to processes for their preparation.

SUMMARY OF INVENTION

Accordingly, this invention provides a two-phase electrophoretic medium comprising a continuous phase and a discontinuous phase, the discontinuous phase comprising a plurality of droplets, each of which comprises a suspending fluid and at least one particle disposed within the suspending fluid and capable of moving through the fluid upon application of an electric field to the electrophoretic medium, and the continuous phase surrounding and encapsulating the discontinuous phase, the discontinuous phase comprising at least about 40 percent by volume of the electrophoretic medium.

This invention also provides a process for producing a two-phase electrophoretic medium, this process comprising:

providing a liquid medium comprising a film-forming material;

dispersing in the liquid medium a plurality of droplets, each of which comprises a suspending fluid and at least one particle disposed within the suspending fluid and capable of moving through the fluid upon application of an electric field thereto; and subjecting the liquid medium to conditions effective to cause the film-forming therein to form a film, and thereby producing a two-phase electrophoretic medium in which the film-forming material forms a continuous phase surrounding and encapsulating the droplets, which form the discontinuous phase of the electrophoretic medium, and in which the discontinuous phase comprises at least about 40 percent by volume of the electrophoretic medium.

BRIEF DESCRIPTION OF DRAWINGS

Preferred embodiments of the invention will now be described, though by way of illustration only, with reference to the accompanying drawings, in which.

DETAILED DESCRIPTION

Figure 1:
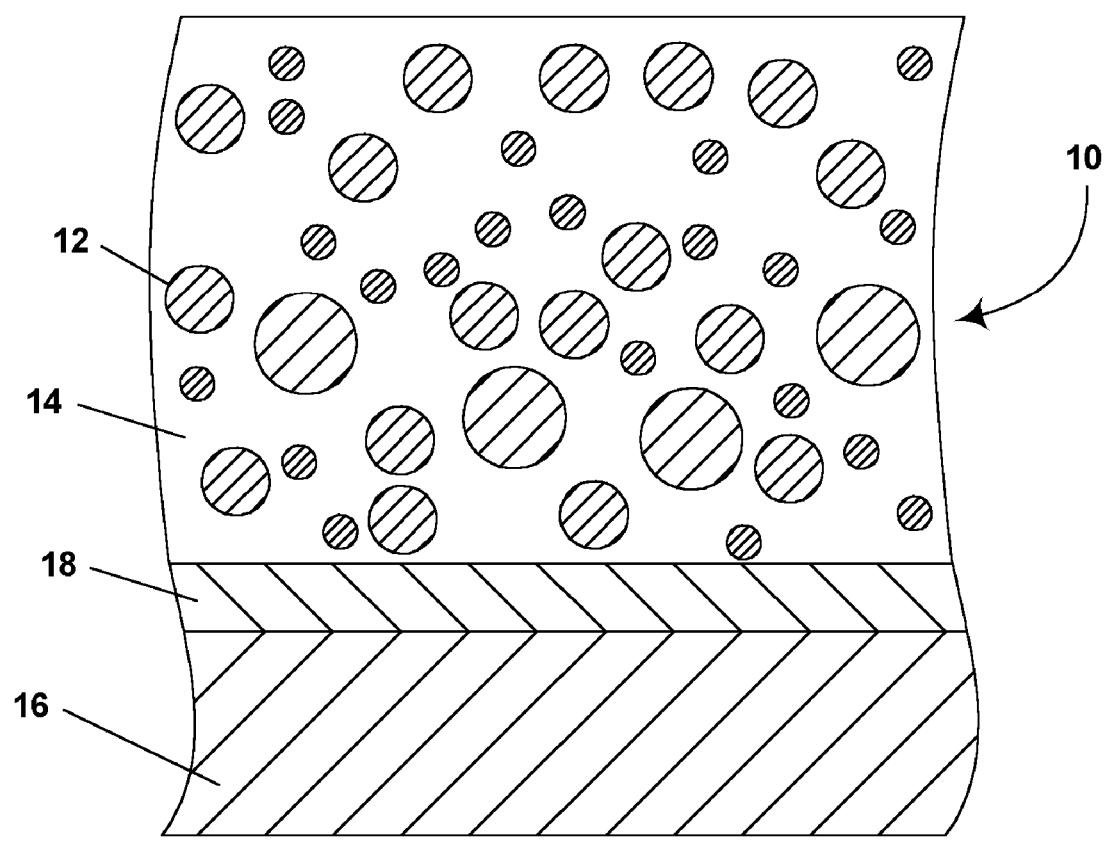
FIG. 1 is a schematic cross-section illustrating an intermediate stage in a process of the present invention after coating a mixture of a liquid medium and electrophoretic droplets on to a substrate but before drying of the mixture.

As already mentioned, the present invention provides a two-phase electrophoretic medium comprising a continuous phase and a discontinuous phase. The discontinuous phase comprises a plurality of droplets, each droplet itself comprising a suspending fluid and at least one particle disposed within the suspending fluid and capable of moving through the fluid upon application of an electric field to the electrophoretic medium. This discontinuous phase comprises at least about 40 percent by volume of the electrophoretic medium. The continuous phase surrounds and encapsulates the discontinuous phase, thus providing a cohesive electrophoretic medium.

In the present electrophoretic medium, the discontinuous phase (droplets) may comprise from about 40 to about 95 percent by volume of the medium, but preferably comprises about 50 to about 80 percent by volume. The optimum proportion of droplets will of course vary with the specific materials employed, but will typically be in the range of about 60 to about 70 percent by volume. If the proportion of droplets is too high, the electrophoretic medium is mechanically weak and easily damaged, and droplets may leak from the medium upon rough handling. On the other hand, it is undesirable to use a proportion of continuous phase substantially larger than that required to provide mechanical strength to the medium. As is well-known to those knowledgeable concerning electrophoretic displays, such displays normally comprise a thin layer of the electrophoretic medium between two electrodes, so that at any given operating voltage between the electrodes, the field applied to the electrophoretic medium is inversely proportional to its thickness. If excess continuous phase is used in the present medium, the thickness of the medium needed to provide a given amount of droplets will be unnecessarily increased, so that either the applied field will be reduced (and the switching time of the display thereby increased) or the operating voltage must be increased, either of which is undesirable.

The droplets used in the present medium may be of any of the types described in the aforementioned patents and applications, as discussed in more detail below. Specifically, the droplets may comprise a single type of particle disposed in a colored suspending fluid, or two or more types of particles, differing in charge polarity and/or electrophoretic mobility; in the latter case, the suspending fluid may be colored or uncolored. However, the use of droplets containing two or more types of particles and an uncolored suspending fluid is generally preferred, since the present invention is well adapted to form electrophoretic media in layers less than 50 µm in thickness (as discussed in more detail below) with droplets less than 20 µm in thickness, and in such thin layers and droplets, there may be difficulty in providing colored suspending fluids having sufficient optical density to completely hide the electrophoretic particles when the particles are drawn away from the viewing surface of the display so that the color of the suspending medium is intended to be visible. As discussed in more detail below, the suspension medium is normally an organic liquid, typically a mixture of a hydrocarbon and a halocarbon, so water-dispersible materials are preferred for the continuous phase of the present electrophoretic medium.

As already indicated, the electrophoretic medium of the present invention is prepared by dispersing the droplets in a liquid medium containing a film-forming material, and then subjecting the liquid medium to conditions effective to cause the film-forming material to form a film and thus produce the two-phase electrophoretic medium in which the film-forming material forms the continuous phase and the droplets for the discontinuous phase. The initial dispersion or emulsification of the droplets in the liquid medium may be effected by any of a variety of conventional techniques, for example rapid stirring of a mixture of the liquid medium and the material which will form the droplets, or sonication of such a mixture. Devices suitable for forming the droplets also include, but are not limited to, blade mixers, rotor-stator mixers and colloid mills, devices in which a liquid stream is pumped at high pressures through an orifice or interation chamber (such as the Microfluidizer sold by Microfluidics), sonicators, Gaulin mills, homogenizers, blenders, etc. The dispersion or emulsification may also be effected by shearing, using a colloid mill or similar apparatus. It should, however, be noted that the presence of the electrophoretic particles within the droplets tends to make a dispersion or emulsion of such droplets less stable than a similar emulsion or dispersion of the same materials in which the droplets do not contains solid particles, and hence in the present process it is preferred to use a liquid medium which can solidify rapidly.

Good results have been achieved by using a gelatin solution as the liquid medium and spreading a thin layer of at least about 50 µm, but preferably from about 50 µm to about 200 µm, on to a cool substrate so that the gelatin solidifies very rapidly. Typically the layer is spread to a thickness of about 100 µm. As already indicated, the film-forming material used in the present invention is preferably gelatin, such as lime-processed gelatin, acid-processed pig gelatin or acid-processed ossein gelatin, or a modified gelatin such as acetylated gelatin, phthalated gelatin, oxidized gelatin, etc. Other film formers include water-soluble polymers and co-polymers including, but not limited to, poly (vinyl alcohol), partially hydrolyzed poly(vinyl acetate/vinyl alcohol), hydroxyethyl cellulose, poly (vinylpyrrolidone), and polyacrylamide. Copolymers of these with hydrophobic monomers, such as t-butyl acrylamide, or isopropyl acrylamide can also be used. Polymeric film formers that are also capable of gelation upon application of high or low temperature are particularly useful. Such materials include the various gelatins described above, cellulosic materials, and homopolymers or copolymers containing isopropyl acrylamide.

Radiation-curable (typically ultra-violet light-curable) materials may also be used as film formers, which could be an aqueous dispersion of a curable polymer, a polymer melt, a monomer, an oligomer or various mixtures of these forms. The curable material could be a separate continuous phase analogous to the gelatin continuous phase already described.

However, the curable material could also be dissolved in the "discontinuous" phase so that upon exposure to the curing radiation, the curable material both cures and separates from the phase in which it is originally dissolved to form a separate continuous phase. Such a system would have the advantage that, prior to the radiation exposure, the liquid medium would constitute only a single phase (except of course for the electrophoretic particles dispersed therein) and coating such a single phase system is often simpler and easier to control than coating of a two-phase system.

The film-forming material may alternatively be a two-component system; for example, one component could be a polymerizable material and the other a polymerization initiator (the use of liquid media containing glycol-type solvents might be useful in such systems), or the two components could be reagents known to be stable in isolation but to form a polymer on contact with one another, for example a polyurethane pre-polymer and water or another active-hydrogen containing material. A two-component film-forming material may be useful, for instance, where it is desired to spray the liquid medium on to a substrate, rather than coat the substrate. As is well-known in the coating industry, a mixture containing a two-component film-forming material can conveniently be sprayed by pumping a liquid medium containing one component through a nozzle provided with an injection port through which the other component is added to the liquid medium, so that the two-component mixture is formed within the nozzle and immediately sprayed.

Alternatively, two-component film-forming materials are available which either have a substantial "lag" time between the time when the components are mixed and the polymerization or other film-forming process occurs, or which require some external stimulus, such as heat or contact with atmospheric moisture, to initiate the film-forming process. Any of these systems permit mixing of all the components of the eventual electrophoretic medium before the liquid medium is deposited upon the substrate.

A two-component film-forming material may also be useful for coating irregularly-shaped substrates and/or coating only certain parts of substrates. In both cases, the first of the two components may be placed on the substrate, or on those parts of the substrate which it is desired to coat with the final electrophoretic medium (for example, an irregularly-shaped substrate could be coated by dip coating), and then the liquid phase containing the second component of the film-forming material could be applied to the substrate so that the electrophoretic medium is formed only on those parts of the substrate previously coated with the first component.

In a further variant of a two-component film-forming material, one of the two components is dispersed in the continuous phase of the liquid medium, while the second component is dispersed in the droplets, so that film formation occurs first at the phase boundary between the droplets and the continuous phase, thus producing weak walls around the droplets and thus reducing any tendency for the droplets to rupture or otherwise become damaged during later handling or shrinkage of the electrophoretic medium.

Both radiation-curable and two-component film-forming materials could also be used in other techniques for patterning the final electrophoretic medium on to a substrate. A continuous layer of a radiation-curable liquid medium could be applied to the substrate and thereafter radiation could be imagewise applied to the continuous layer so that the cured electrophoretic medium is only formed where the continuous layer is exposed to the radiation; the radiation-curable liquid medium would thus act like a positive photoresist. Similarly, a continuous layer of a liquid medium containing only one component of a two-component film-forming material could be applied to a substrate and the second component applied in an imagewise manner so that the cured electrophoretic medium is only formed where the second component is applied. In either case, the uncured liquid medium could then be washed off leaving a patterned electrophoretic medium on the substrate.

Such patterning techniques may be used to form color electrophoretic displays. It has previously been suggested that full color electrophoretic displays could be formed in a manner analogous to the phosphors on color cathode ray tubes by patterning three different types of microencapsulated electrophoretic media capable of displaying different color in separate but closely-spaced areas of the display. Such a structure could be produced by repeating the procedure described in the preceding paragraph three times with different discontinuous phases in the electrophoretic media, the uncured liquid medium being removed after each radiation exposure or application of the second component.

(The radiation-curing technique described above is analogous to a conventional positive photoresist. A process of the present invention analogous to a negative photoresist is also possible. Such a process would form an electrophoretic medium having a continuous phase which would depolymerize or otherwise degrade upon exposure to radiation. The electrophoretic medium would be formed by any of the techniques described above, imagewise exposed to radiation to degrade the areas where no electrophoretic medium was desired in the final product, and washed with an appropriate solvent (which need not be aqueous) to remove the degraded electrophoretic medium. This process would, however, be complicated to use than the "positive photoresist" variant described above.)

The radiation-curing and two-component film-forming material techniques described above could be used in combination with other techniques to form the electrophoretic media of the present invention. For example, radiation-curing or two-component film-forming material could be used to produce an initial stable film from a liquid phase and thereafter this stable film could be dried or otherwise treated to cause it to shrink and form the final electrophoretic medium. Alternatively, either radiation exposure, or deposition of the second component of a two-component film-forming material on to the surface, of a film of liquid medium on a substrate may be useful in forming a "skin" on the exposed surface of the layer of liquid medium; such a skin may, in some systems, be useful in reducing any tendency for droplets of the discontinuous phase to rupture at this exposed surface.

The present invention also allows for formation of patterned electrophoretic medium by a technique analogous to lithographic printing. A substrate may be patterned in a manner which allows the liquid medium used in the present process to deposit upon some areas of the substrate but not others. For example, a hydrophilic substrate could be printed with a conventional water-repellant lithographic ink, thus rendering the ink-covered areas hydrophobic, and the printed substrate treated with a liquid medium, similar to those used in the Examples above, having a hydrophilic gelatin-based continuous phase, so that the liquid medium only deposits on the unprinted areas of the substrate. After drying and formation of the electrophoretic medium, the ink could if desired be removed using a non-aqueous solvent. Alternatively and perhaps more conveniently, the ink could be replaced by a similar liquid comprising only the hydrophobic vehicle of a conventional lithographic ink, without the pigment, thus avoiding any need to remove the colored ink after formation of the final electrophoretic medium.

The present invention provides considerable flexibility in the physical form of the final electrophoretic medium. For example, by using either a hot melt polymer (such as ethylene/vinyl acetate) or a reactive injection molding urethane polymer, the present process can make use of conventional injection molding techniques to form sheets of electrophoretic medium of any desired shape with a mold.

It must be emphasized that the present invention is not restricted to any particular technique for formation of the droplets in the liquid medium, or to any particular type of physico-chemical change for film formation. For example, in addition to the techniques previously described, the liquid medium could be formed by coextrusion of its two phases through a nozzle, as known in the art for forming other types of emulsions. Alternatively, the droplets of the discontinuous phase could be formed by emulsification in one medium, and the droplets separated from the bulk of the phase of this medium and redispersed in a different medium to form the liquid phase used in the present process. The liquid medium may also be formed by high internal phase emulsion techniques, as described for example in Cameron, N. R., and Sherrington, D. C., "High Internal Phase Emulsions (HIPEs) Structure, Properties and Use in Polymer Preparation", Adv. Polym. Sci., 126, 163 (1996); and Bampfield, H. A., and Cooper, J., "Emulsion Explosives", in "Encyclopedia of Emulsion Technology: Volume 3 Basic Theory Measurement Applications, Becher, P. (ed.), Marcel Dekker, N.Y. (1988). The limited coalescence process may be used to create essentially monodisperse droplets with adjustable diameters from about 1 micron to over 100 micron. This process is described in U.S. Pat. Nos. 4,994,312; 5,055,371; 2,932,629; 2,934,530; 4,833,060; 4,835,084; 4,965,131; 5,354,799; 5,580,692; 5,700,608, 6,156,473; and 6,113,810. The droplets may also be formed by shearing the liquid used to form the droplets, or by couette flow (passage of a liquid through a narrow gap between two relatively moving surfaces, for example between two co-axial cylinders one of which is fixed and the other moving).

In the present process, film formation may take place by a sol/gel transformation, using for example a water glass based continuous phase.

As will be apparent from the foregoing discussion, a wide variety of materials may be used in the present process. Aqueous external phases in this process may include dispersion polymers, such as latices, urethane dispersions, silicones and epoxies, and solution polymers such as poly (vinyl alcohol) and polyvinylpyrrolidone. Film-forming materials which may be useful include lower consolute temperature polymers such as N-isopropylacrylamide, and highly shear thinning, high low-shear viscosity polymers such as gums, xanthan, carageenan, associative thickeners, and cellulosic gelling agents, which may also form the continuous phase matrix. Silicone polymers may be used in the continuous phase where stability of the medium is of major concern. Also, the continuous phase may comprise a pressure-sensitive adhesive to improve adhesion of the electrophoretic medium to the substrate. A wide variety of solvents, for example fluorosilicones, may be used as the liquid vehicles in the discontinuous phase.

The present invention may be varied by first forming a layer comprising the continuous phase of an electrophoretic medium and then injected droplets of electrophoretic fluid into this layer, for example by ink jet printing or similar techniques. Where the continuous phase is of a type which is to be shrunk to produce the final electrophoretic medium, it is generally desirable to inject the droplets of electrophoretic fluid before shrinking the medium to provide, in the final medium, non-spherical droplets, for the reasons already discussed.

In order to assist in stabilizing the droplets, it is advantageous to add a surfactant to the dispersion or emulsion, a preferred surfactant for this purpose being sodium dodecyl sulfate, typically added in an amount of about 0.1 to about 1 percent by weight of the liquid medium. Other surfactants which may be useful include Alkanol XC (an alkyl sulfonate surfactant available from E. I. du Pont de Nemours and Company, Wilmington, Del.), sodium dodecylbenzenesulfonate, bis(2-ethylhexyl)sulfosuccinate (available as Aerosol OT from Cytec Industries, Inc., West Paterson N.J. 07424). Non-ionic surfactants and zwitterionic surfactants, for example betaines and lecithin-type molecules, may also be useful. Since dispersions of electrophoretic particles used to form the droplet in the present medium often contain substantial amounts of surfactants, some of which will inevitably diffuse to the droplet/continuous phase boundary, it may be necessary to adjust the amount of surfactant added the dispersion or emulsion to allow for the effects of the surfactant already present in the droplets.

Although the discontinuous phase of the present medium is referred to herein as "droplets", such references are not to be construed as limiting the discontinuous phase to spherical or near-spherical droplets. Indeed, it is preferred that the droplets not be spherical. As discussed in the aforementioned U.S. Pat. No. 6,067,185, there are significant advantages to using non-spherical droplets in electrophoretic media, and this patent discusses various ways in which spherical microcapsules may deliberately be distorted into non-spherical shapes during incorporation of such microcapsules into a binder. The present invention has the advantage that, by careful choice of materials and processing conditions, the electrophoretic medium can be formed with its discontinuous phase in the form of non-spherical droplets.

Figure 2:
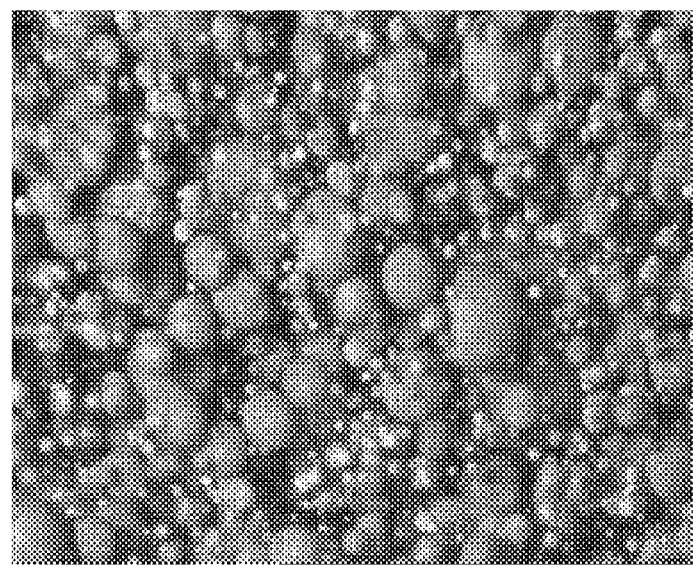
FIG. 2 is a photomicrograph showing a top plan view of the intermediate stage shown in FIG. 1.
Figure 3:
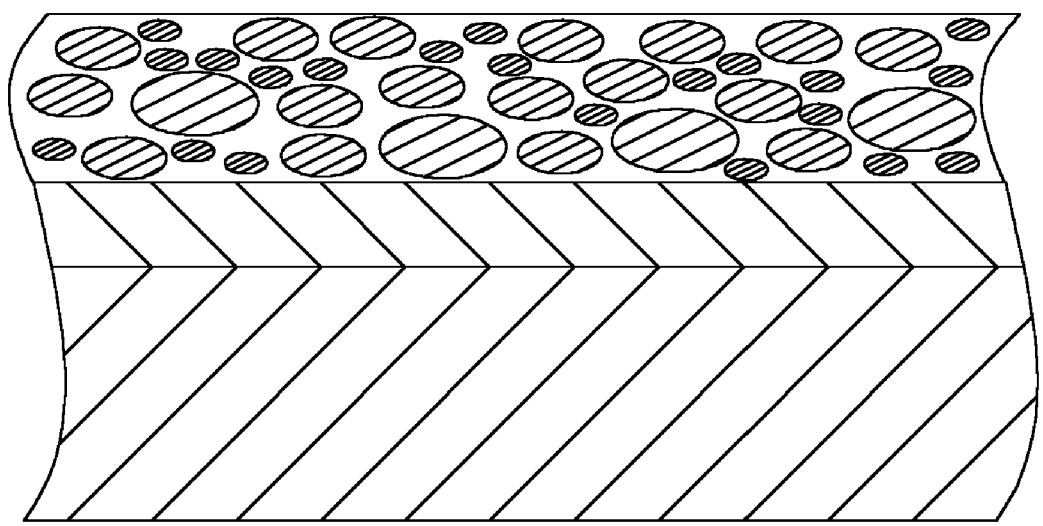
FIG. 3 is a schematic cross-section similar to that FIG. 1, but showing the final medium of the present invention after drying.
Figure 4:
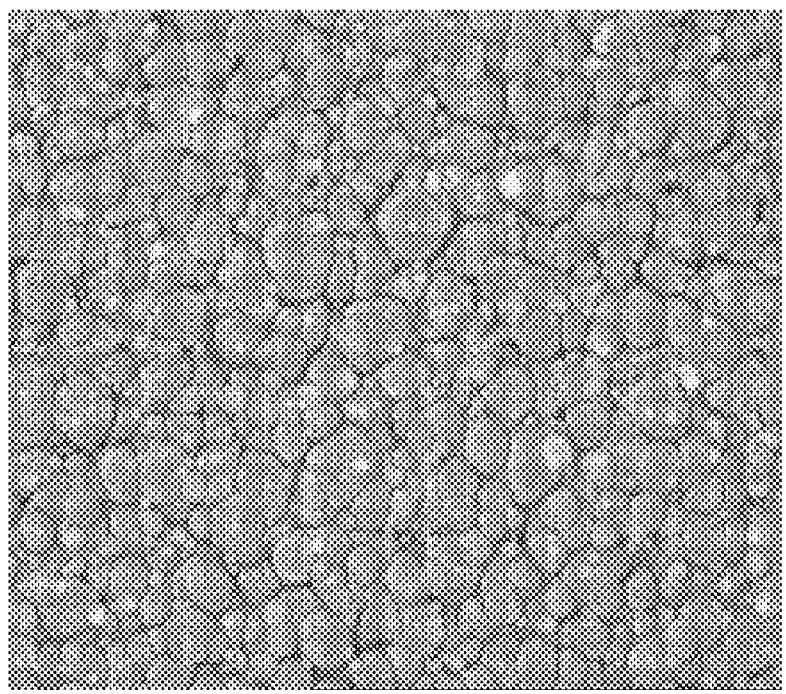
FIG. 4 is a photomicrograph similar to that FIG. 2 but showing a top plan view of the final medium shown in FIG. 3.

Media of the present invention containing non-spherical droplets can readily be prepared by using a film-forming material which produces a film which can be shrunk substantially after its formation. The preferred discontinuous phase for this purpose is gelatin, although other proteinaceous materials, and possibly cross-linkable polymers may alternatively be employed. A mixture of the liquid material (which will eventually form the continuous phase) and the droplets is formed and coated on to a substrate to form a structure as illustrated in FIGS. 1 and 2. FIG. 1 shows a layer 10 comprising droplets 12 dispersed in a liquid medium 14 which is in the process of forming a film, this layer 10 having been coated on a substrate 16 (preferably a flexible polymeric film, such as a polyester film) previously provided with a layer 18 of a transparent electrically conductive material, such as indium-tin oxide. The liquid material forms a relatively thick layer 10 containing essentially spherical droplets 12; as shown in FIG. 1. After the layer 10 has formed a solid continuous phase, the layer is then allowed to dry, preferably at about room temperature (although the layer may be heated if desired) for a period sufficient to dehydrate the gelatin, thus causing substantial reduction in the thickness of the layer and producing the type of structure illustrated in FIGS. 3 and 4, the dried and shrunken layer being designated 10" in FIG. 3. The "vertical" shrinkage of the layer (i.e., the shrinkage perpendicular to the surface of the substrate 16) in effect compresses the original spherical droplets into oblate ellipsoids whose thickness perpendicular to the surface is substantially smaller than their lateral dimensions parallel to the surface. In practice, as illustrated in FIG. 4, the droplets are normally sufficiently closely packed that the lateral edges of adjacent droplets contact each other, so that the final forms of the droplets more closely resemble irregular prisms than oblate ellipsoids. Also as shown in FIG. 3, more than one layer of droplets may be present in the final medium. When the medium is of the type shown in FIGS. 3 and 4 in which the droplets are polydisperse (i.e., a wide range of droplet sizes are present), the presence of such multiple layers is advantageous in that it reduces the chance that small areas of the substrate will not be covered by any droplet; hence, the multiple layers help to ensure that the electrophoretic medium is completely opaque and that no part of the substrate is visible in a display formed from the medium. However, in a medium using essentially monodisperse droplets (i.e., droplets all of substantially the same size), it will generally be advisable to coat the medium in a layer which, after shrinkage, will produce a close-packed monolayer of droplets, cf. copending application Ser. No. 09/413,444, filed Oct. 6, 1999, and the corresponding International Application No. PCT/US99/23313, Publication No. WO 00/20922. Because they lack the relatively rigid microcapsule walls found in microencapsulated electrophoretic media, the droplets used in the present invention may tend to pack more tightly into a close-packed monolayer than do microcapsules.

Contrary to what might be expected, experimentally it has been found that, at least in the preferred embodiments of the invention described in the Examples below, the droplets do not coalesce during the drying of the medium. However, we do not exclude the possibility that, in certain embodiments of the invention some rupturing of the walls between adjacent capsules might occur, thus providing a partial connection between droplets.

The degree of deformation of the droplets which occurs during the drying step, and hence the final forms of the droplets, may be varied by controlling the proportion of water in the gelatin solution and the ratio of this solution to the droplets. For example, experiments were conducted using gelatin solutions of from 2 to 15 percent by weight, and using 200 grams of each gelatin solution and 50 grams of the "internal" non-aqueous phase which forms the droplets. To produce a final layer of electrophoretic medium 30 µm in thickness, it was necessary to coat a layer of the 2 percent gelatin solution/internal phase mixture 139 µm in thickness; upon drying, this layer produced an electrophoretic medium 30 µm in thickness containing 92.6 percent by volume of droplets. On the other hand, to produce the same final thickness of electrophoretic medium, the 15 percent gelatin solution/internal phase mixture was coated at a thickness of 93 µm, and upon drying produced an electrophoretic medium containing 62.5 percent by volume of droplets. The medium produced from the 2 percent gelatin solution was weaker than is desirable to withstand robust handling; media produced from gelatin solutions containing from 5 to 15 percent by weight of gelatin had satisfactory mechanical properties.

The degree of deformation of the droplets in the final electrophoretic medium is also affected by the initial size of the droplets, and the relationship between this initial size and the thickness of the final layer of electrophoretic medium. Experiments indicate that the larger the average initial size of the droplets and/or the larger the ratio of this average initial size to the thickness of the final layer, the greater is the deformation of the droplets from a spherical shape in the final layer. In general, it is preferred that the average initial size of the droplets be from about 25 percent to about 400 percent of the thickness of the final layer. For example, in the experiments previously described, in which the thickness of the final layer was 30 µm, good results were obtained with an initial average droplet size of 10 to 100 µm.

Gelatin forms a film by a sol/gel transformation, but the present invention is not restricted to film-forming materials which form their films by such sol/gel transformation. For example, the formation of the film may be accomplished by the polymerization of a monomer or oligomer, by the cross-linking of a polymer or oligomer, or by any other known film-forming process. Similarly, in the preferred variant of the invention in which the film is first formed and then caused to shrink in thickness, this shrinkage need not accomplished by the same type of dehydration mechanism by which a gelatin film shrinks, but may be accomplished by removal of a solvent, aqueous or non-aqueous, from the film, cross-linking of a polymeric film or any other conventional procedure.

From the foregoing, it will be seen that the present invention can be used to form the electrophoretic medium in the form of layers less than 50 µm in thickness. Indeed, the present invention can be used to prepare electrophoretic media in layers as thin as 20 µm, and possibly even thinner. Such thin layers have the advantage that they reduce the operating voltage and/or switching time of an electrophoretic display. Obviously, for any layer of a specific electrophoretic medium, the operating voltage required is proportional to the thickness of the medium. Also, at any given field strength the switching time of the medium is directly proportional to the distance which the electrophoretic particles must move to effect switching, and this distance is substantially equal to the thickness of a droplet perpendicular to the substrate. Accordingly, at a given operating voltage, the switching time of a layer of electrophoretic medium is proportional to the square of the thickness of the layer. Accordingly, the very thin layers of electrophoretic medium which can be achieved using the present invention allow for lowered operating voltages and/or switching times.

The process of the present invention also offers the advantage of reduced processing time as compared with processes for the production of microencapsulated electrophoretic media. The preferred emulsification/coating/drying procedure of the present invention described above using gelatin can be completed in about 1 to 2 hours; in contrast, the microencapsulation process described in Example 1 of the aforementioned Publication No. WO 99/10767 involves a processing time of at least two working days, with at least one overnight step.

The following Examples are now given, though by way of illustration only, to show details of particularly preferred reagents, conditions and techniques used in the present electrophoretic medium and process for its preparation.

EXAMPLE 1

An internal dual-particle phase (i.e., a phase which will eventually form droplets) was prepared containing 30 percent by weight of polymer-coated white particles (titania) and 5 percent by weight polymer-coated black particles (carbon black) in a suspension medium comprising a mixture of a hydrocarbon (Isopar-G, available commercially from Exxon Corporation, Houston, Tex.; "Isopar" is a Registered Trade Mark) and a halogenated hydrocarbon oil (Halogenated hydrocarbon oil 0.8, available commercially from Halogenated Hydrocarbon Products Corporation, River Edge, N.J.) and containing a dispersant (Solsperse 17000, available commercially from Avecia Ltd., Blackley, Manchester, United Kingdom; "Solsperse" is a Registered Trade Mark). Separately, a 15 percent w/w solution of pigskin gelatin (300 Bloom strength gelatin from Dynagel Inc., Calumet City, Ill. 60409) was prepared. The gelatin solution (200 g) was placed in a reactor equipped with a stirrer, SDS (0.3 g) was added, and the resultant mixture was stirred gently (at 100 rpm) and brought to 45° C. The internal phase (66.3 g) previously warmed to 45° C. was added over a period of about 10 seconds through a tube opening below the surface of the gelatin solution under intense stirring (250 rpm), and this stirring was continued for 30 minutes.

A 10 ml aliquot of the resultant emulsion was transferred by means of a pipette to an ITO-coated polyester film and spread over the film by a draw down bar provided with a 2.5 mil (63 µm) gap. The thin layer thus produced solidified almost immediately, and the coated polyester film was then allowed to dry in air at ambient temperature for 15 minutes. The thickness of the final layer of electrophoretic medium thus produced was approximately 20 µm, and microscopy indicated that the maximum droplet size in the medium was about 10 µm.

In order to test the switching properties of the medium, a conductive adhesive tape, comprising a pressure-sensitive adhesive loaded with carbon black, was applied to the exposed surface of the medium, and then an ITO-coated polyester film was applied to the adhesive tape. A 15 V square wave form (500 msec at 15 V followed by 500 msec at 0 V) was applied to the ITO electrodes. The electrophoretic medium switched in both directions in less than 100 msec, and displayed a white state reflectance of 22.4 percent and a dark state reflectance of 3.0 percent.

EXAMPLE 2

Example 1 was repeated except that the internal phase contained 17 percent by weight white particles and 1.8 percent by weight black particles, and that only 59.5 g of internal phase was added to 200 g of gelatin solution in order to keep the volume ratio of the two phases the same as in Example 1. Also, a 5 mil (127 µm) gap was used with the draw down bar to produce a dried electrophoretic medium approximately 41 µm thick and having a maximum droplet size of about 35 µm.

In order to test the switching properties of the medium, the medium was vacuum laminated at 60° C. to a ITO-coated polyester using NeoRez R-9320 urethane binder (available commercially from Zeneca Resins, Wilmington, Del.; NeoRez is a Registered Trade Mark) as the lamination adhesive; the lamination adhesive layer in the final structure was 79 µm thick. A 30 V square wave form (500 msec at 30 V followed by 500 msec at 0 V) was applied to the electrodes. The electrophoretic medium switched in both directions in less than 70 msec, and displayed a white state reflectance of 27.3 percent and a dark state reflectance of 6.6 percent.

Apart from the use of a two-phase structure rather than capsules contained in a binder, electrophoretic displays of the present invention resemble prior art encapsulated electrophoretic displays, and hence, as already noted, the present displays can make use of any known materials and processes for the production of such displays.

The successful construction of an electrophoretic display requires the proper interaction of several different types of materials and processes. Materials such as that used to form the continuous phase, any adhesive used to secure the electrophoretic medium to an electrode, the electrophoretic particles, and the suspending fluid must all be chemically compatible. The continuous phase may engage in useful surface interactions with the electrophoretic particles, or may act as an inert physical container for these particles.

In an electrophoretic display of the present invention, the continuous phase surrounds the droplets and separates the two electrodes. This continuous phase must be compatible with the droplets and electrodes and should possess properties that allow for facile printing or coating. It may also possess barrier properties for water, oxygen, ultraviolet light, the electrophoretic fluid, or other materials, Further, it may contain surfactants and cross-linking agents, which could aid in coating or durability.

The following Sections A–C describe useful materials for use in the various components of the electrophoretic displays of the present invention.

A. Electrophoretic Particles

There is much flexibility in the choice of particles for use in electrophoretic displays. For purposes of this invention, a particle is any component that is charged or capable of acquiring a charge (i.e., has or is capable of acquiring electrophoretic mobility), and, in some cases, this mobility may be zero or close to zero (i.e., the particles will not move). The particles may be neat pigments, dyed (laked) pigments or pigment/polymer composites, or any other component that is charged or capable of acquiring a charge. Typical considerations for the electrophoretic particle are its optical properties, electrical properties, and surface chemistry. The particles may be organic or inorganic compounds, and they may either absorb light or scatter light. The particles for use in the invention may further include scattering pigments, absorbing pigments and luminescent particles. The particles may be retroreflective, such as corner cubes, or they may be electroluminescent, such as zinc sulfide particles, which emit light when excited by an AC field, or they may be photoluminescent. Zinc sulfide electroluminescent particles may be encapsulated with an insulative coating to reduce electrical conduction. Finally, the particles may be surface treated so as to improve charging or interaction with a charging agent, or to improve dispersability.

One particle for use in electrophoretic displays of the invention is titania. The titania particles may be coated with a metal oxide, such as aluminum oxide or silicon oxide, for example. The titania particles may have one, two, or more layers of metal-oxide coating. For example, a titania particle for use in electrophoretic displays of the invention may have a coating of aluminum oxide and a coating of silicon oxide. The coatings may be added to the particle in any order.

The electrophoretic particle is usually a pigment, a polymer, a laked pigment, or some combination of the above. A neat pigment can be any pigment, and, usually for a light colored particle, pigments such as rutile (titania), anatase (titania), barium sulfate, kaolin, or zinc oxide are useful. Some typical particles have high refractive indices, high scattering coefficients, and low absorption coefficients. Other particles are absorptive, such as carbon black or colored pigments used in paints and inks. The pigment should also be insoluble in the suspending fluid. Yellow pigments such as diarylide yellow, Hansa yellow, and benzidin yellow have also found use in similar displays. Any other reflective material can be employed for a light colored particle, including non-pigment materials, such as metallic particles.

Useful neat pigments include, but are not limited to, $PbCrO_4$, Cyan blue GT 55-3295 (American Cyanamid Company, Wayne, N.J.), Cibacron Black BG (Ciba Company, Inc., Newport, Del.), Cibacron Turquoise Blue G (Ciba), Cibalon Black BGL (Ciba), Orasol Black BRG (Ciba), Orasol Black RBL (Ciba), Acetamine Black, CBS (E. I. du Pont de Nemours and Company, Inc., Wilmington, Del., hereinafter abbreviated "du Pont"), Crocein Scarlet N Ex (du Pont) (27290), Fiber Black VF (du Pont) (30235), Luxol Fast Black L (du Pont) (Solv. Black 17), Nirosine Base No. 424 (du Pont) (50415 B), Oil Black BG (du Pont) (Solv. Black 16), Rotalin Black RM (du Pont), Sevron Brilliant Red 3 B (du Pont); Basic Black DSC (Dye Specialties, Inc.), Hectolene Black (Dye Specialties, Inc.), Azosol Brilliant Blue B (GAF, Dyestuff and Chemical Division, Wayne, N.J.) (Solv. Blue 9), Azosol Brilliant Green BA (GAF) (Solv. Green 2), Azosol Fast Brilliant Red B (GAF), Azosol Fast Orange RA Conc. (GAF) (Solv. Orange 20), Azosol Fast Yellow GRA Conc. (GAF) (13900 A), Basic Black KMPA (GAF), Benzofix Black CW-CF (GAF) (35435), Cellitazol BNFV Ex Soluble CF (GAF) (Disp. Black 9), Celliton Fast Blue AF Ex Conc (GAF) (Disp. Blue 9), Cyper Black IA (GAF) (Basic Black 3), Diamine Black CAP Ex Conc (GAF) (30235), Diamond Black EAN Hi Con. CF (GAF) (15710), Diamond Black PBBA Ex (GAF) (16505); Direct Deep Black EA Ex CF (GAF) (30235), Hansa Yellow G (GAF) (11680); Indanthrene Black BBK Powd. (GAF) (59850), Indocarbon CLGS Conc. CF (GAF) (53295), Katigen Deep Black NND Hi Conc. CF (GAF) (15711), Rapidogen Black 3 G (GAF) (Azoic Black 4); Sulphone Cyanine Black BA-CF (GAF) (26370), Zambezi Black VD Ex Conc. (GAF) (30015); Rubanox Red CP-1495 (The Sherwin-Williams Company, Cleveland, Ohio) (15630); Raven 11 (Columbian Carbon Company, Atlanta, Ga.), (carbon black aggregates with a particle size of about 25 μm), Statex B-12 (Columbian Carbon Co.) (a furnace black of 33 μm average particle size), and chrome green.

Particles may also include laked, or dyed, pigments. Laked pigments are particles that have a dye precipitated on them or which are stained. Lakes are metal salts of readily soluble anionic dyes. These are dyes of azo, triphenylmethane or anthraquinone structure containing one or more sulphonic or carboxylic acid groupings. They are usually precipitated by a calcium, barium or aluminum salt onto a substrate. Typical examples are peacock blue lake (Cl Pigment Blue 24) and Persian orange (lake of Cl Acid Orange 7), Black M Toner (GAF) (a mixture of carbon black and black dye precipitated on a lake).

A dark particle of the dyed type may be constructed from any light absorbing material, such as carbon black, or inorganic black materials. The dark material may also be selectively absorbing. For example, a dark green pigment may be used. Black particles may also be formed by staining latices with metal oxides, such latex copolymers consisting of any of butadiene, styrene, isoprene, methacrylic acid, methyl methacrylate, acrylonitrile, vinyl chloride, acrylic acid, sodium styrene sulfonate, vinyl acetate, chlorostyrene, dimethylaminopropylmethacrylamide, isocyanoethyl methacrylate and N-(isobutoxymethacrylamide), and optionally including conjugated diene compounds such as diacrylate, triacrylate, dimethylacrylate and trimethacrylate. Black particles may also be formed by a dispersion polymerization technique.

In the systems containing pigments and polymers, the pigments and polymers may form multiple domains within the electrophoretic particle, or be aggregates of smaller pigment/polymer combined particles. Alternatively, a central pigment core may be surrounded by a polymer shell. The pigment, polymer, or both can contain a dye. The optical purpose of the particle may be to scatter light, absorb light, or both. Useful sizes may range from 1 nm up to about 100 μm, as long as the particles are smaller than the bounding capsule. The density of the electrophoretic particle may be substantially matched to that of the suspending (i.e., electrophoretic) fluid. As defined herein, a suspending fluid has a density that is "substantially matched" to the density of the particle if the difference in their respective densities is between about zero and about two grams/milliliter ("g/ml"). This difference is preferably between about zero and about 0.5 g/ml.

Useful polymers for the particles include, but are not limited to: polystyrene, polyethylene, polypropylene, phenolic resins, du Pont Elvax resins (ethylene-vinyl acetate copolymers), polyesters, polyacrylates, polymethacrylates, ethylene acrylic acid or methacrylic acid copolymers (Nucrel Resins du Pont, Primacor Resins Dow Chemical), acrylic copolymers and terpolymers (Elvacite Resins du Pont) and PMMA. Useful materials for homopolymer/pigment phase separation in high shear melt include, but are not limited to, polyethylene, polypropylene, poly(methyl methacrylate), poly(isobutyl methacrylate), polystyrene, polybutadiene, polyisoprene, polyisobutylene, poly(lauryl methacrylate), poly(stearyl methacrylate), poly(isobornyl methacrylate), poly(t-butyl methacrylate), poly(ethyl methacrylate), poly(methyl acrylate), poly(ethyl acrylate), polyacrylonitrile, and copolymers of two or more of these materials. Some useful pigment/polymer complexes that are commercially available include, but are not limited to, Process Magenta PM 1776 (Magruder Color Company, Inc., Elizabeth, N.J.), Methyl Violet PMA VM6223 (Magruder Color Company, Inc., Elizabeth, N.J.), and Naphthol FGR RF6257 (Magruder Color Company, Inc., Elizabeth, N.J.).

The pigment-polymer composite may be formed by a physical process, (e.g., attrition or ball milling), a chemical process (e.g., microencapsulation or dispersion polymerization), or any other process known in the art of particle production. For example, the processes and materials for both the fabrication of liquid toner particles and the charging of those particles may be relevant.

New and useful electrophoretic particles may still be discovered, but a number of particles already known to those skilled in the art of electrophoretic displays and liquid toners can also prove useful. In general, the polymer requirements for liquid toners and electrophoretic inks are similar, in that the pigment or dye must be easily incorporated therein, either by a physical, chemical, or physicochemical process, may aid in the colloidal stability, and may contain charging sites or may be able to incorporate materials which contain charging sites. One general requirement from the liquid toner industry that is not shared by electrophoretic inks is that the toner must be capable of "fixing" the image, i.e., heat fusing together to create a uniform film after the deposition of the toner particles.

Typical manufacturing techniques for particles may be drawn from the liquid toner and other arts and include ball milling, attrition, jet milling, etc. The process will be illustrated for the case of a pigmented polymeric particle. In such a case the pigment is compounded in the polymer, usually in some kind of high shear mechanism such as a screw extruder. The composite material is then (wet or dry) ground to a starting size of around 10 μm. It is then dispersed in a carrier liquid, for example ISOPAR (Exxon, Houston, Tex.), optionally with some charge control agent(s), and milled under high shear for several hours down to a final particle size and/or size distribution.

Another manufacturing technique for particles is to add the polymer, pigment, and suspending fluid to a media mill. The mill is started and simultaneously heated to a temperature at which the polymer swells substantially with the solvent. This temperature is typically near 100° C. In this state, the pigment is easily encapsulated into the swollen polymer. After a suitable time, typically a few hours, the mill is gradually cooled back to ambient temperature while stirring. The milling may be continued for some time to achieve a small enough particle size, typically a few microns in diameter. The charging agents may be added at this time. Optionally, more suspending fluid may be added.

Chemical processes such as dispersion polymerization, mini- or micro-emulsion polymerization, suspension polymerization precipitation, phase separation, solvent evaporation, in situ polymerization, seeded emulsion polymerization, or any process which falls under the general category of microencapsulation may be used. A typical process of this type is a phase separation process wherein a dissolved polymeric material is precipitated out of solution onto a dispersed pigment surface through solvent dilution, evaporation, or a thermal change. Other processes include chemical means for staining polymeric latices, for example with metal oxides or dyes.

B. Suspending Fluid

The suspending fluid containing the particles can be chosen based on properties such as density, refractive index, and solubility. A preferred suspending fluid has a low dielectric constant (about 2), high volume resistivity (about $10^{15}$ ohm-cm), low viscosity (less than 5 centistokes ("cst")), low toxicity and environmental impact, low water solubility (less than 10 parts per million ("ppm")), high specific gravity (greater than 1.5), a high boiling point (greater than 90° C.), and a low refractive index (less than 1.2).

The choice of suspending fluid may be based on concerns of chemical inertness, density matching to the electrophoretic particle, or chemical compatibility with both the electrophoretic particle and the continuous phase. The viscosity of the fluid should be low when movement of the particles is desired. The refractive index of the suspending fluid may also be substantially matched to that of the particles. As used herein, the refractive index of a suspending fluid "is substantially matched" to that of a particle if the difference between their respective refractive indices is between about zero and about 0.3, and is preferably between about 0.05 and about 0.2.

Additionally, the fluid may be chosen to be a poor solvent for some polymers, which is advantageous for use in the fabrication of microparticles, because it increases the range of polymeric materials useful in fabricating particles of polymers and pigments. Organic solvents, such as halogenated organic solvents, saturated linear or branched hydrocarbons, silicone oils, and low molecular weight halogen-containing polymers are some useful suspending fluids. The suspending fluid may comprise a single fluid. The fluid will, however, often be a blend of more than one fluid in order to tune its chemical and physical properties. Furthermore, the fluid may contain surface modifiers to modify the surface energy or charge of the electrophoretic particle or bounding capsule. Reactants or solvents for the microencapsulation process (oil soluble monomers, for example) can also be contained in the suspending fluid. Charge control agents can also be added to the suspending fluid.

Useful organic solvents include, but are not limited to, epoxides, such as decane epoxide and dodecane epoxide; vinyl ethers, such as cyclohexyl vinyl ether and Decave® (International Flavors & Fragrances, Inc., New York, N.Y.); and aromatic hydrocarbons, such as toluene and naphthalene. Useful halogenated organic solvents include, but are not limited to, tetrafluorodibromoethylene, tetrachloroethylene, trifluorochloroethylene, 1,2,4-trichlorobenzene and carbon tetrachloride. These materials have high densities. Useful hydrocarbons include, but are not limited to, dodecane, tetradecane, the aliphatic hydrocarbons in the Isopar® series (Exxon, Houston, Tex.), Norpar® (a series of normal paraffinic liquids), Shell-Sol® (Shell, Houston, Tex.), and Sol-Trol® (Shell), naphtha, and other petroleum solvents. These materials usually have low densities. Useful examples of silicone oils include, but are not limited to, octamethyl cyclosiloxane and higher molecular weight cyclic siloxanes, poly(methyl phenyl siloxane), hexamethyldisiloxane, and polydimethylsiloxane. These materials usually have low densities. Useful low molecular weight halogen-containing polymers include, but are not limited to, poly(chlorotrifluoroethylene)polymer (Halogenated Hydrocarbon Inc., River Edge, N.J.), Galden® (a perfluorinated ether from Ausimont, Morristown, N.J.), or Krytox® from du Pont (Wilmington, Del.). In a preferred embodiment, the suspending fluid is a poly(chlorotrifluoroethylene)polymer. In a particularly preferred embodiment, this polymer has a degree of polymerization from about 2 to about 10. Many of the above materials are available in a range of viscosities, densities, and boiling points.

The fluid must be capable of being formed into small droplets prior to combination with the continuous phase. Processes for forming small droplets include flow-through jets, membranes, nozzles, or orifices, as well as shear-based emulsifying schemes. The formation of small drops may be assisted by electrical or sonic fields. As already mentioned, surfactants, and possibly also polymers, can be used to aid in the stabilization and emulsification of the droplets.

It can be advantageous in some displays for the suspending fluid to contain an optically absorbing dye. This dye must be soluble in the fluid, but will generally be insoluble in the other components of the capsule. There is much flexibility in the choice of dye material. The dye can be a pure compound, or blends of dyes to achieve a particular color, including black. The dyes can be fluorescent, which would produce a display in which the fluorescence properties depend on the position of the particles. The dyes can be photoactive, changing to another color or becoming colorless upon irradiation with either visible or ultraviolet light, providing another means for obtaining an optical response. Dyes could also be polymerizable by, for example, thermal, photochemical or chemical diffusion processes, forming a solid absorbing polymer inside the droplet.

There are many dyes that can be used in electrophoretic displays. Properties important here include light fastness, solubility in the suspending liquid, color, and cost. These dyes are generally chosen from the classes of azo, anthraquinone, and triphenylmethane type dyes and may be chemically modified so as to increase their solubility in the oil phase and reduce their adsorption by the particle surface.

A number of dyes already known to those skilled in the art of electrophoretic displays will prove useful. Useful azo dyes include, but are not limited to: the Oil Red dyes, and the Sudan Red and Sudan Black series of dyes. Useful anthraquinone dyes include, but are not limited to: the Oil Blue dyes, and the Macrolex Blue series of dyes. Useful triphenylmethane dyes include, but are not limited to, Michler's hydrol, Malachite Green, Crystal Violet, and Auramine O.

C. Charge Control Agents and Particle Stabilizers

Charge control agents are used to provide good electrophoretic mobility to the electrophoretic particles. Stabilizers are used to prevent agglomeration of the electrophoretic particles, as well as prevent the electrophoretic particles from irreversibly depositing onto the droplet wall. Either component can be constructed from materials across a wide range of molecular weights (low molecular weight, oligomeric, or polymeric), and may be a single pure compound or a mixture. The charge control agent used to modify and/or stabilize the particle surface charge is applied as generally known in the arts of liquid toners, electrophoretic displays, non-aqueous paint dispersions, and engine-oil additives. In all of these arts, charging species may be added to non-aqueous media in order to increase electrophoretic mobility or increase electrostatic stabilization. The materials can improve steric stabilization as well. Different theories of charging are postulated, including selective ion adsorption, proton transfer, and contact electrification.

An optional charge control agent or charge director may be used. These constituents typically consist of low molecular weight surfactants, polymeric agents, or blends of one or more components and serve to stabilize or otherwise modify the sign and/or magnitude of the charge on the electrophoretic particles. The charging properties of the pigment itself may be accounted for by taking into account the acidic or basic surface properties of the pigment, or the charging sites may take place on the carrier resin surface (if present), or a combination of the two. Additional pigment properties which may be relevant are the particle size distribution, the chemical composition, and the lightfastness.

Charge adjuvants may also be added. These materials increase the effectiveness of the charge control agents or charge directors. The charge adjuvant may be a polyhydroxy compound or an aminoalcohol compound, and is preferably soluble in the suspending fluid in an amount of at least 2% by weight. Examples of polyhydroxy compounds which contain at least two hydroxyl groups include, but are not limited to, ethylene glycol, 2,4,7,9-tetramethyldecyne-4,7-diol, poly(propylene glycol), pentaethylene glycol, tripropylene glycol, triethylene glycol, glycerol, pentaerythritol, glycerol tris(12-hydroxystearate), propylene glycerol monohydroxy-stearate, and ethylene glycol monohydroxystearate. Examples of aminoalcohol compounds which contain at least one alcohol function and one amine function in the same molecule include, but are not limited to, triisopropanolamine, triethanolamine, ethanolamine, 3 o-aminophenol, 5-amino-1-pentanol, and tetrakis(2-hydroxy The charge adjuvant is preferably present in the suspending fluid in an amount of about 1 to about 100 milligrams per gram ("mg/g") of the particle mass, and more preferably about 50 to about 200 mg/g.

The surface of the particle may also be chemically modified to aid dispersion, to improve surface charge, and to improve the stability of the dispersion, for example. Surface modifiers include organic siloxanes, organohalogen silanes and other functional silane coupling agents (Dow Corning® Z-6070, Z-6124, and 3 additive, Midland, Mich.); organic titanates and zirconates (Tyzor® TOT, TBT, and TE Series, du Pont); hydrophobing agents, such as long chain ($C_{12}$ to $C_{50}$) alkyl and alkyl benzene sulphonic acids, fatty amines or diamines and their salts or quaternary derivatives; and amphipathic polymers which can be covalently bonded to the particle surface.

In general, it is believed that charging results as an acid-base reaction between some moiety present in the continuous phase and the particle surface. Thus useful materials are those which are capable of participating in such a reaction, or any other charging reaction as known in the art.

Different non-limiting classes of charge control agents which are useful include organic sulfates or sulfonates, metal soaps, block or comb copolymers, organic amides, organic zwitterions, and organic phosphates and phosphonates. Useful organic sulfates and sulfonates include, but are not limited to, sodium bis(2-ethylhexyl) sulfosuccinate, calcium dodecylbenzenesulfonate, calcium petroleum sulfonate, neutral or basic barium dinonylnaphthalene sulfonate, neutral or basic calcium dinonylnaphthalene sulfonate, dodecylbenzenesulfonic acid sodium salt, and ammonium lauryl sulfate. Useful metal soaps include, but are not limited to, basic or neutral barium petronate, calcium petronate, Co—, Ca—, Cu—, Mn—, Ni—, Zn—, and Fe— salts of naphthenic acid, Ba—, Al—, Zn—, Cu—, Pb—, and Fe— salts of stearic acid, divalent and trivalent metal carboxylates, such as aluminum tristearate, aluminum octanoate, lithium heptanoate, iron stearate, iron distearate, barium stearate, chromium stearate, magnesium octanoate, calcium stearate, iron naphthenate, zinc naphthenate, Mn— and Zn— heptanoate, and Ba—, Al—, Co—, Mn—, and Zn— octanoate. Useful block or comb copolymers include, but are not limited to, AB diblock copolymers of (A) polymers of 2-(N,N-dimethylamino)ethyl methacrylate quaternized with methyl p-toluenesulfonate and (B) poly(2-ethylhexyl methacrylate), and comb graft copolymers with oil soluble tails of poly(12-hydroxystearic acid) and having a molecular weight of about 1800, pendant on an oil-soluble anchor group of poly(methyl methacrylate-methacrylic acid). Useful organic amides include, but are not limited to, polyisobutylene succinimides such as OLOA 1200, and N-vinylpyrrolidone polymers. Useful organic zwitterions include, but are not limited to, lecithin. Useful organic phosphates and phosphonates include, but are not limited to, the sodium salts of phosphated mono- and di-glycerides with saturated and unsaturated acid substituents.

Particle dispersion stabilizers may be added to prevent particle flocculation or attachment to the droplet walls. For the typical high resistivity liquids used as suspending fluids in electrophoretic displays, non-aqueous surfactants may be used. These include, but are not limited to, glycol ethers, acetylenic glycols, alkanolamides, sorbitol derivatives, alkyl amines, quaternary amines, imidazolines, dialkyl oxides, and sulfosuccinates.

Like other encapsulated electrophoretic displays, the electrophoretic displays of the present invention provide flexible, reflective displays that can be manufactured easily and consume little power (or no power in the case of bistable displays in certain states). Such displays, therefore, can be incorporated into a variety of applications and can take on many forms. Once the electric field is removed, the electrophoretic particles can be generally stable. Additionally, providing a subsequent electric charge can alter a prior configuration of particles. Such displays may include, for example, a plurality of anisotropic particles and a plurality of second particles in a suspending fluid. Application of a first electric field may cause the anisotropic particles to assume a specific orientation and present an optical property. Application of a second electric field may then cause the plurality of second particles to translate, thereby disorienting the anisotropic particles and disturbing the optical property. Alternatively, the orientation of the anisotropic particles may allow easier translation of the plurality of second particles. Alternatively or in addition, the particles may have a refractive index that substantially matches the refractive index of the suspending fluid.

As already mentioned, an electrophoretic display can be constructed so that the optical state of the display is stable for some length of time. When the display has two states that are stable in this manner, the display is bistable, within the meaning of that term as previously defined; if more than two states of the display are stable, then the display is multistable. However, whether a display is effectively bistable state depends upon the display's application. A slowly decaying optical state can be effectively bistable if the optical state is substantially unchanged over the required viewing time. For example, in a display that is updated every few minutes, a display image that is stable for hours or days is effectively bistable for a particular application. Alternatively, it is possible to construct electrophoretic displays in which the image decays quickly once the addressing voltage to the display is removed (i.e., the display is not bistable or multistable). Whether or not an electrophoretic display is bistable, and its degree of bistability, can be controlled through appropriate chemical modification of the electrophoretic particles, the suspending fluid, and the continuous phase material.

An electrophoretic display may take many forms. The particles within the capsules of such a display may be colored, luminescent, light-absorbing or transparent, for example.

It will readily be apparent to those skilled in the relevant art that numerous changes and modifications could be made to preferred embodiments of the invention discussed above without departing from the scope of the invention. For example, the gelatin continuous phase described in the Examples above could be replaced by an aqueous dispersion of a polymer, or a solution of a water-soluble polymer, in both cases with the addition of an aqueous gelling agent or thickener. Alternatively, the droplets could be replaced by microcapsules; such microcapsules would not need mechanically strong walls (so that, for example, the cross-linking normally used to strengthen the walls of the microcapsules could be omitted), since the continuous phase itself provides encapsulation and isolation of the microcapsules.

A large number of other modifications are possible in the present invention.

In view of all the foregoing possible variation of the present invention, the whole of the foregoing description should be construed in an illustrative and not in a limitative sense.

What is claimed is:

1. A two-phase electrophoretic medium comprising a continuous phase and a discontinuous phase, the discontinuous phase comprising a plurality of droplets, each of which comprises a suspending fluid and at least one particle disposed within the suspending fluid and capable of moving through the fluid upon application of an electric field to the electrophoretic medium, the continuous phase surrounding and encapsulating the discontinuous phase, the discontinuous phase comprising at least about 40 per cent by volume of the electrophoretic medium.

2. A two-phase electrophoretic medium according to claim 1 wherein said discontinuous phase comprises about 40 to about 95 percent by volume.

3. A two-phase electrophoretic medium according to claim 2 wherein said discontinuous phase comprises about 50 to about 80 percent by volume.

4. A two-phase electrophoretic medium according to claim 3 wherein said discontinuous phase comprises about 60 to about 70 percent by volume.

5. A two-phase electrophoretic medium according to claim 1 wherein said droplets comprise a single type of particle disposed in a colored suspending fluid.

6. A two-phase electrophoretic medium according to claim 1 wherein said droplets comprise at least two types of particles differing in at least one of charge polarity and electrophoretic mobility, and wherein said suspending fluid is colored.

7. A two-phase electrophoretic medium according to claim 1 wherein said droplets comprise at least two types of particles differing in at least one of charge polarity and electrophoretic mobility, and wherein said suspending fluid is uncolored.

8. A two-phase electrophoretic medium according to claim 1 wherein said suspending fluid is selected from organic solvents, halogenated solvents, halogenated polymers, silicone oils, linear hydrocarbons, branched hydrocarbons, and mixtures thereof.

9. A suspending fluid according to claim 8 wherein said halogenated polymer comprises poly(chlorotrifluoroethylene).

10. A two-phase electrophoretic medium according to claim 1 wherein said particles comprises one or more of neat pigments, dyed pigments, laked pigments, and pigment/polymer composites.

11. A two-phase electrophoretic medium according to claim 1 wherein said droplets contain two types of particles comprising titania and carbon black respectively.

12. A continuous phase according to claim 1 wherein said continuous phase comprises a radiation-cured material.

13. A continuous phase according to claim 1 wherein said continuous phase comprises gelatin.

14. A two-phase electrophoretic medium according to claim 13 wherein the gelatin comprises from about 5 percent to about 15 percent by weight of said electrophoretic medium.

* * * * *